United States Patent [19]

Buffham et al.

[11] Patent Number: 4,819,683

[45] Date of Patent: Apr. 11, 1989

[54] PRESSURE RELIEF DEVICE

[75] Inventors: Brian W. Buffham, Merseyside, England; Daniel J. Marquardt, Waterloo, Ill.

[73] Assignee: Petrolite Corporation, St. Louis, Mo.

[21] Appl. No.: 150,341

[22] Filed: Jan. 29, 1988

[51] Int. Cl.$^4$ ............................................. F16K 17/14
[52] U.S. Cl. .................................... 137/71; 220/89 A
[58] Field of Search ........................ 137/68.1, 71, 797; 220/89 A

[56] References Cited

U.S. PATENT DOCUMENTS

| | | | |
|---|---|---|---|
| 2,764,173 | 9/1956 | Renner | 137/68.1 |
| 2,853,097 | 9/1958 | Davis | 137/71 |
| 3,155,271 | 11/1964 | Summers et al. | 137/71 X |
| 3,216,611 | 11/1965 | Lechevallier | 137/68.1 X |
| 3,485,082 | 12/1969 | Myers | 137/71 X |
| 3,797,511 | 3/1974 | Selby | 137/71 |
| 3,872,875 | 3/1975 | Raidl, Jr. | 137/71 |
| 4,232,513 | 11/1980 | Pearson et al. | 137/797 X |

Primary Examiner—John Rivell
Attorney, Agent, or Firm—Robert E. Wexler

[57] ABSTRACT

A pressure release device for sealably mounting on a vessel adapted to contain a fluid under pressure not to exceed a predetermined maximum pressurization limit. The device comprises: (a) a pressure release conduit having an inlet and an outlet and providing an escape passage for the fluid to move from an outlet opening of the vessel through the inlet end of the conduit and out the outlet end of the conduit; (b) a recloseable self-activated fluid pressure release valve disposed in the outlet end of the conduit; (c) a nonrecloseable disc having a portion rupturable into fragments when the pressurization limit is exceeded and being disposed within the conduit between the outlet opening of the vessel and the release valve; and (d) a porous member disposed in the conduit between the disc and the release valve, the porous member having a total cross sectional open area at least about the sum of the cross sectional area of the rupturable portion of said disc and the cross sectional area of the outlet opening, such that when the disc ruptures in response to the pressurization limit being exceeded, fragments are restrained by the porous member from moving to the release valve, yet substantial clogging of the porous member is prevented such that the porous member maintains a cross sectional open area of at least about the cross sectional area of the outlet opening and the flow of the fluid through the conduit to the release valve is not substantially impeded.

4 Claims, 1 Drawing Sheet

U.S. Patent
Apr. 11, 1989
4,819,683
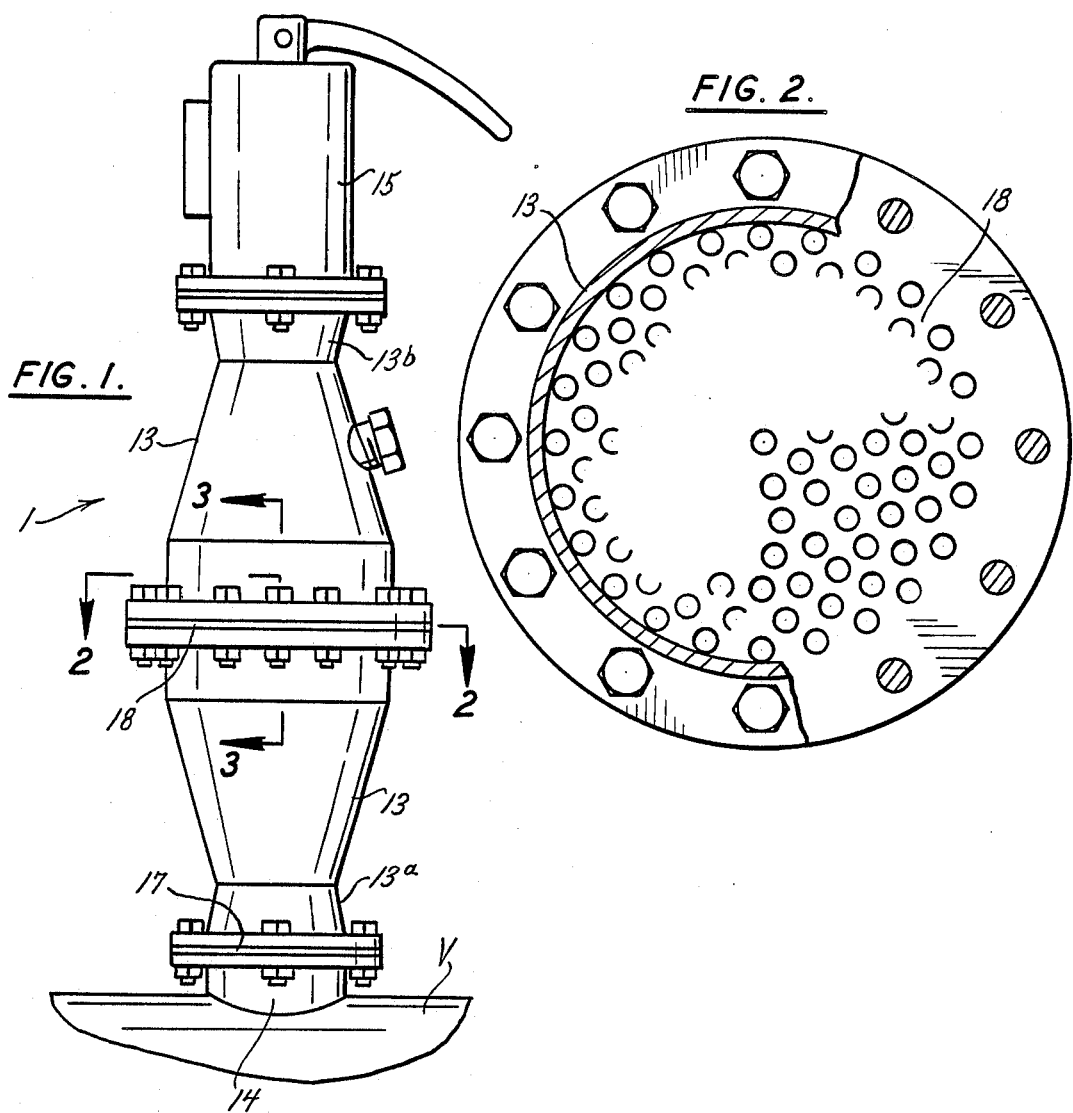
FIG. 1.
FIG. 2.
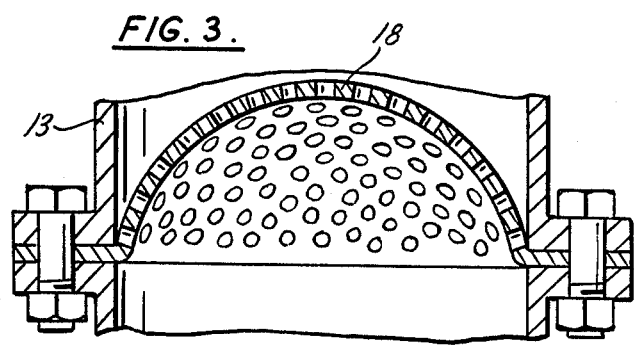
FIG. 3.

PRESSURE RELIEF DEVICE

BACKGROUND OF THE INVENTION

1. Field of the Invention

This invention relates to safety pressure relief devices utilizing bursting discs, and more particularly to such devices utilizing fragmentable bursting discs in combination with safety relief valves.

2. Prior Art

Conventionally, a variety of arrangements are employed for safety pressure relief in pressurized systems such as pressurized conduits, storage or reaction tanks or other vessels. One arrangement involves use of a pressure relief or bursting disc. A bursting disc ruptures upon exposure to pressure in excess of a selected design pressure, thereby creating an opening in the pressurized system and allowing pressure relief.

Two basic types of bursting discs are generally employed for such safety pressure relief. A graphite disc or a simple or tension disc will fragment upon rupture of the disc. A reverse buckling disc does not fragment upon rupture of the disc. Instead, under pressure exceeding a predetermined limit, a reverse buckling disc is pressed against cutting blades, causing the disc to be sliced; and the pressurized fluid forces the disc slices to "peel" back or retract out of the path of the fluid.

Use of bursting discs, however, involves several drawbacks. For example, bursting discs are not reusable. Rupture of a bursting disc destroys the disc, necessitating its replacement. In addition, since a bursting disc does not automatically reseal itself (or reseal itself at all for that matter) after rupture, the contents of a vessel protected by a bursting disc tend to flow out of the opening created by the ruptured disc and to continue to flow out of the opening until the pressure inside the vessel equalizes with the pressure outside the system. Thus, large quantities of the system contents may be lost; and further, contamination of the system surroundings by the system contents may create dangerous conditions.

Another method for safety pressure relief, use of a pressure relief valve, may avoid such drawbacks. However, use of safety relief valves also entails attendant disadvantages. For example, exposure of the pressure relief valve to the contents of the vessel or conduit, as typically occurs in attachment of the valve directly to the system, may result in corrosion of the valve. In an effort to avoid corrosion, valves formed of expensive materials such as stainless steel are often employed, increasing system costs. Moreover, the vessel or conduit contents may build up on the internal surfaces of the valve, blocking or plugging up the valve. Development of such corrosion or buildup tends to interfere with or to prevent proper operation of the valve.

In an effort to alleviate the drawbacks of bursting discs, as well as those of safety relief valves, bursting discs have been installed in combination with pressure relief valves. According to this method, a bursting disc is installed in a closed system between a pressure relief valve and the vessel or conduit. The contents of the vessel or conduit are thus isolated from the pressure relief valve, thereby avoiding corrosion of or buildup on the valve. Moreover, when the bursting disc ruptures, the safety relief valve will generally release the contents of the vessel or conduit until the pressure in the vessel or conduit falls below the design pressure of the valve. At that point, the valve reseals, retaining the remaining vessel or conduit contents within the vessel or conduit.

However, even this method has been found to suffer serious drawbacks. When a fragmentable bursting disc is used, upon rupture of the disc, fragments from the disc tend to be projected at high velocity toward the pressure relief valve, thereby damaging the valve or becoming so situated as to disrupt an effective seating of the valve and preventing resealing of the vessel or conduit. On the other hand, use of non-fragmentable bursting discs is undesirable for several reasons. Such discs not only are fragile, but also are more expensive than fragmentable bursting discs. Further, since the relatively incompressible nature of liquids in liquid filled systems allows pressure relief upon release of merely a small amount of liquids, non-fragmentable bursting discs tend not to rupture completely and so are not generally acceptable for liquid filled systems.

SUMMARY OF THE INVENTION

Briefly, therefore, the present invention is directed to a novel pressure relief device for sealably mounting on a vessel adapted to contain a fluid under pressure not to exceed a predetermined maximum pressurization limit. The device comprises (1) a pressure release conduit having an inlet and an outlet and providing an escape passage for the fluid to move from an outlet opening of the vessel through the inlet end of the conduit and out the outlet end of the conduit, (2) a recloseable self-activated fluid pressure release valve disposed in the outlet end of the conduit, (3) a non-recloseable disc having a portion rupturable into fragments when the pressurization limit is exceeded and being disposed within the conduit between the outlet opening of the vessel and the release valve, and (4) a porous member disposed in the conduit between the disc and the release valve. The porous member has a total cross sectional open area at least about the sum of the cross sectional area of the rupturable portion of the disc and the cross sectional area of the outlet opening, such that when the disc ruptures in response to the pressurization limit being exceeded, fragments are restrained by the porous member from moving to the release valve, yet substantial clogging of the porous member is prevented such that the porous member maintains a cross sectional open area of at least about the cross-sectional area of the outlet opening and the flow of the fluid through the conduit to the release valve is not substantially impeded.

Among the several advantages achieved by of the present invention, therefore, may be noted the provision of a pressure relief device that is relatively low cost and self-resealing, yet resists corrosion and plugging by contents of a vessel or conduit to which the device is mounted. Moreover, the device of this invention is relatively insensitive to damage and is suitable for use with pressurized liquid systems. In addition, the device incorporates or is adapted for use with a fragmentable bursting disc, yet resists damage or interruption of resealing ability of the device upon rupture of the disc.

BRIEF DESCRIPTION OF THE DRAWINGS

FIG. 1 is a side elevation view of a pressure relief device of this invention; and FIG. 2 is a cross-sectional view along line 2—2 of FIG. 1;

FIG. 3 is cross-sectional view along line 3—3 of FIG. 1 and showing a domed shaped porous member incorporated in a second embodiment of a pressure relief device of this invention.

Corresponding reference characters indicate corresponding parts throughout the several views of the drawings.

DETAILED DESCRIPTION OF THE PREFERRED EMBODIMENTS

Referring now to FIG. 1 of the drawings, there is generally indicated by numeral 1 a pressure relief device of this invention for sealably mounting on a vessel V adapted to contain a fluid, i.e., a gas, a liquid, an intermediate state or a combination thereof, under pressure not to exceed a predetermined maximum pressurization limit. Device 1 comprises a pressure release conduit 13 having an inlet at 13a and an outlet at 13b. Conduit 13 provides an escape passage for fluid to move from an outlet 14 of a vessel V to which device 1 is attached through inlet 13a of conduit 13 and out outlet 13b of conduit 13 to release valve 15. Device 1 also comprises a recloseable self-activated fluid pressure release valve 15 disposed in outlet 13b of conduit 13, and a nonrecloseable disc 17 having a portion rupturable into fragments when the pressurization limit of disc 17 is exceeded. Disc 17 is disposed within conduit 13 between the outlet opening 14 of the vessel V and release valve 15.

Device 1 further comprises a porous member 18 disposed in conduit 13 between disc 17 and release valve 15. Porous member 18 is shown in greater detail in FIG. 2 and has a total cross sectional open area at least about the sum of the cross sectional area of the rupturable portion of disc 17 and the cross sectional area of outlet 14, so that when disc 17 ruptures in response to the pressurization limit of disc 17 being exceeded, fragments of disc 17 are restrained by porous member 18 from moving to release valve 15, yet substantial clogging of porous member 18 is prevented and such that porous member 18 maintains a cross sectional open area of at least about the cross sectional area of outlet 14 and the flow of the fluid through the conduit to the release valve is not substantially impeded.

Vessel V may comprise any pressurizable container, such as a storage tank, autoclave, reaction tank or conveyance conduit. Disc 17 is adapted to be sealably mounted onto outlet 14 by means of flanges. The term "disc" as used herein with reference to non-recloseable "discs" having a rupturing portion comports to the general use of the term in the art as, for example, in the phrase "bursting disc", and so it should be understood that a such "discs" need be neither planar nor circular.

Conduit 13 provides communication between disc 17, porous member 18 and valve 15. Since conduit 13 ordinarily (i.e., when disc 17 is unruptured) is shielded by disc 17 from the contents of vessel V, the particular material forming conduit 13 need not be expensive. Thus, conduit 13 may be formed of standard steel or other alloys. Moreover, as illustrated in FIG. 1, conduit 13 need not be formed of a single uninterrupted piece, but may comprise separate portions, with one portion extending between disc 17 and porous member 18 and the other portion extending between porous member 18 and valve 15.

Porous member 18 is a barrier that has openings or perforations. Such openings or perforations should be small enough to restrain at least the larger fragments of a ruptured disk, and large enough to minimize interference with fluid flow. Generally, openings of diameter between about 1 and about 10 mm are appropriate. Porous member 18 should be strong enough to avoid tearing, fracturing or otherwise breaking when struck by disc fragments propelled against porous member 18 upon rupture of disc 17. Unless disc 17 is ruptured, porous member 18 is shielded by disc 17 from the contents of vessel V. Therefore, as long as the material forming porous member 18 is sufficiently strong, the particular material of valve 15 is not critical, so under many conditions standard steel is adequate.

Disc 17 is preferably a standard commercial "bursting disk". Since disc 17 would be exposed to the contents of vessel V, selection of disc material depends on the vessel contents, and relatively expensive material such as stainless steel might be required. In a preferred embodiment, disc 17 has a rupturable portion of cross sectional area approximately equal to the cross sectional area of outlet 14 so that porous member 18 has an open area at least about twice the cross sectional area of outlet 14, thereby ensuring that an open path of cross sectional area at least as great as the cross sectional area of outlet 14 is maintained even if all fragments from the ruptured bursting disc occlude the openings or perforations of porous member 18. Thus, in this embodiment, in order for porous member 18 to have an open area at least twice the cross sectional area of outlet 14, porous member 18 must have a total surface area (the total of the open area and closed area) greater than twice the cross sectional area of outlet 14.

Accordingly, if porous member 18 is planar, conduit 13 may be comprised of two portions, one portion extending between disc 17 and porous member 18 and the other portion extending between porous member 18 and valve 15, where the former portion is a simple concentric reducer as shown in FIG. 1. In such case, if the open area of porous member 18 is 50% of the total surface area of porous member 18, the diameter of porous member 18 should be at least twice the diameter of outlet 14. In other words, twice the diameter means four times the surface area (area of a circle being proportional to the square of the diameter or radius), and since the surface area is 50% open, the open area of porous member 18 would be twice the cross sectional area of outlet 14.

However, porous member 18 need not be planar, but may be domed or conical. If porous member 18 is non-planar, the diameter of a circle defined by the periphery of porous member 18 may be less than twice the diameter of outlet 14. In fact, if porous member 18 is non-planar, conduit 13 may be of constant diameter along its length, as shown in FIG. 2. Thus, it is the open surface area, not the diameter, of porous member 18 that is relevant to the invention. Moreover, if porous member 18 is domed or conical, it may be disposed in conduit 13 so that it is concave toward disc 17 or valve 15, as desired.

In use in combination with a pressurized system, the pressure relief device further comprises conventional safety relief valve 15 situated on the opposite side of porous member 18 from bursting disc 17, and is mounted on outlet 13b of conduit 13. Since the cost of a valve generally is related to the size of the valve, with larger valves being more expensive than smaller valves, if porous member 18 has a diameter larger than the diameter of outlet 14, it is preferable that the portion of conduit 13 extending between porous member 18 and valve 15 be a reducer as shown in FIG. 1, so that valve 15 need be of no larger diameter than that required to adequately vent the volume of fluid as needed. Ordinarily, that is, when disc 17 is unruptured, valve 15 is shielded by the disc from the content of vessel V, the particular material forming valve 15 generally is not critical, and may be standard steel.

Since a bursting disc operates by sensitivity to a pressure differential across the bursting disc, it may be desired to provide conduit 13 with a pressure tap to avoid a pressure buildup between disc 17 and safety relief valve 15. Under ordinary conditions, pressure tap 19 is (a) vented to a safe area with or without a flow check or (b) closed with a pressure sensing alarm. A manual bleed valve may be provided to reduce the pressure which may have built up in conduit 13. At that point, pressure tap is opened to allow pressurized fluid in conduit 13 to escape until pressure within conduit 13 equalizes with the external pressure. Pressure tap 19 may be located on either the disc side or valve side of porous member 18.

Since valve 15 acts as a back-up to disc 17, in selecting the pressure rating, or "design pressure" of valve 15 and disc 17, it may be desirable to select a disc of slightly lower pressure rating or design pressure than that of valve 15.

Thus, in operation, in for example, the manufacture of oil field chemicals or water treating chemicals, reactors or blending vessels are often employed for containing polymers under relatively high pressure. By way of illustration, the vessel might be designed for withstanding 150 p.s.i., the design pressure of the bursting disc might be 115 p.s.i., and the design pressure of the valve might be 125 p.s.i. In addition, as a back-up the vessel might be equipped with a bursting disc rated at 140 p.s.i. mounted on another outlet of the vessel. If the pressure in the vessel exceeds 115 p.s.i., disc 17 ruptures, opening conduit 13 to the contents of the vessel. Upon such rupture, fragments of the disc are propelled toward valve 15. Larger, and presumably more dangerous, fragments of the rupturing disc are restrained by porous member 18, decreasing the chance of damaging valve 15 or interfering with the resealing ability of the valve. If the pressure exceeds 125 p.s.i., valve 15 opens, allowing pressure relief until the pressure reduces to below 125 p.s.i., whereupon the valve reseals, preventing continued loss of vessel contents.

The following examples illustrate the invention.

EXAMPLE 1

A pressure relief device was manufactured for mounting on a 4 inch vessel opening. Two 8 inch×4 inch 150 pound, class 100 flanged concentric reducers were connected with the 8 inch ends facing each other and a porous member in between. The porous member was a 2 mm. thick stainless steel plate having 6 mm. diameter round holes and 50% open area. A fragmentable bursting disc mounted on a 4 inch opening of a vessel was also mounted at the 4 inch end of one of the reducers. A 4 inch pressure safety valve was connected to the other 4 inch reducer end. A ¾ inch 3000 pound fitting commonly known as a "sockolet" was mounted as a pressure tap on the reducer between the porous member and the valve.

EXAMPLE 2

A pressure relief device was manufactured for mounting on a 3 inch vessel opening. Two 6 inch×3 inch 150 pound, class 100 flanged concentric reducers were connected with the 6 inch ends facing each other and a porous member in between. The porous member was a 2 mm. thick stainless steel plate having 6 mm. diameter round holes and 50% open area. A fragmentable bursting disc mounted on a 3 inch opening of a vessel was also mounted at the 3 inch end of one of the reducers. A 3 inch pressure safety valve was connected to the other 3 inch reducer end. A ¾ inch 3000 pound fitting commonly known as a "sockolet" was mounted as a pressure tap on the reducer between the porous member and the valve.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A pressure release device for sealably mounting on a vessel adapted to contain a fluid under pressure not to exceed a predetermined maximum pressurization limit comprising:
   (a) a pressure release conduit having an inlet and an outlet and providing an escape passage for the fluid to move from an outlet opening of the vessel through the inlet end of the conduit and out the outlet end of the conduit, said opening being generally circular;
   (b) a recloseable self-activated fluid pressure release valve disposed in the outlet end of the conduit;
   (c) a nonrecloseable disc having a portion rupturable into fragments when the pressurization limit is exceeded and being disposed within the conduit between the outlet opening of the vessel and the release valve;
   (d) a flat porous member having a diameter larger than the diameter of said outlet opening of said vessel and disposed in the conduit between said nonrecloseable disc and said release valve, said flat porous disc having a total cross sectional open area at least about the sum of the cross sectional area of the rupturable portion of said nonrecloseable disc and the cross sectional area of the outlet opening, such that when the said disc ruptures in response to the pressurization limit being exceeded, fragments of the disc are restrained by said porous member from moving to the release valve, yet substantially clogging of said porous member is prevented such that said porous member maintains a cross sectional open area of at least about the cross sectional area of the outlet opening and the flow of the fluid through the conduit to the release valve is not substantially impeded; and
   (e) said conduit being of generally circular cross section and having a relatively enlarged inside diameter about said porous member and relatively reduced diameter at each of said inlet end and said outlet end.

2. A pressure release device for sealably mounting on a vessel adapted to contain a fluid under pressure not to exceed a predetermined maximum pressurization limit comprising:
   (a) a pressure release conduit having an inlet and an outlet and providing an escape passage for the fluid to move from an outlet opening of the vessel through the inlet end of the conduit and out the outlet end of the conduit, said opening being generally circular;

(b) a recloseable self-activated fluid pressure release valve disposed in the outlet end of the conduit;

(c) a nonrecloseable disc having a portion rupturable into fragments when the pressurization limit is exceeded and being disposed within the conduit between the outlet opening of the vessel and the release valve;

(d) a domed or conical porous member disposed in the conduit between said disc and said release valve, said porous member having a total cross sectional open area at least about the sum of the cross sectional area of the rupturable portion of said disc and the cross sectional area of the outlet opening, such that when the said disc rupture in response to the pressurization limit being exceeded, fragments of the disc are restrained by said porous member from moving to the release valve, yet substantial clogging of said porous member is prevented such that said porous member maintains a cross sectional open area of at least about the cross sectional area of the outlet opening and the flow of the fluid through the conduit to the release valve is not substantially impeded; and (e) said conduit being of generally circular cross section and having a relatively enlarged inside diameter about said porous member and relatively reduced diameter at each of said inlet end and said outlet end.

3. In a vessel adapted to contain a fluid under pressure not to exceed a predetermined maximum pressurization limit and equipped with a pressure release system activated when said limit is exceeded, said system comprising a pressure release conduit of generally circular cross section having an inlet end and an outlet end providing an escape passage for the fluid to move from an outlet opening of a vessel through the inlet end of a conduit and out the outlet end of the conduit, said opening of said vessel being generally circular, a recloseable self-activated fluid pressure release valve disposed in the outlet end of the conduit, and a nonrecloseable disc having a portion rupturable into fragments when the pressurization limit is exceeded and being disposed within the conduit between the outlet opening of the vessel and said release valve, the improvement characterized by a generally flat porous member having a diameter larger than the diameter of said outlet opening of said vessel and being disposed between said disc and said release valve and having a total cross sectional area at least about the sum of the cross sectional area of the rupturable portion of said disc, such that when the disc ruptures in response to the pressurization limit being exceeded, fragments of the disc are restrained by said porous member from moving to said release valve, yet substantially clogging of said porous member is prevented such that said porous member maintains a cross sectional open area at least about the cross sectional area of the outlet opening and the flow of the fluid through said conduit to said release valve is not substantially impeded, said conduit being of generally circular cross section having a relatively enlarged inside diameter about said porous member and relatively reduced diameter at each of said inlet end and said outlet end.

4. In a vessel adapted to contain a fluid under pressure not to exceed a predetermined maximum pressurization limit and equipped with a pressure release system activated when said limit is exceeded, said system comprising a pressure release conduit having an inlet end and an outlet end providing an escape passage for the fluid to move from an outlet opening of a vessel through the inlet end of a conduit and out the outlet end of the conduit, said opening of said vessel being generally circular, a recloseable self-activated fluid pressure release valve disposed in the outlet end of the conduit, and a nonrecloseable disc having a portion rupturable into fragments when the pressurization limit is exceeded and being disposed within the conduit between the outlet opening of the vessel and said release valve, the improvement characterized by a domed or conical porous member being disposed between said disc and said release valve and having a total cross sectional area at least about the sum of the cross sectional area of the rupturable portion of said disc, such that when the disc ruptures in response to the pressurization limit being exceeded, fragments are restrained by said porous member from moving to said release valve, yet substantially clogging of said porous member is prevented such that said porous member maintains a cross sectional open area at least about the cross sectional area of the outlet opening and the flow of the fluid through said conduit to said release valve is not substantially impeded, said conduit being of generally circular cross section having a relatively enlarged inside diameter about said porous member and relatively reduced diameter at each of said inlet end and said outlet end.

* * * * *